July 29, 1930. T. A. BRYSON 1,771,525
DRIVING MECHANISM
Original Filed Feb. 12, 1921  2 Sheets-Sheet 1
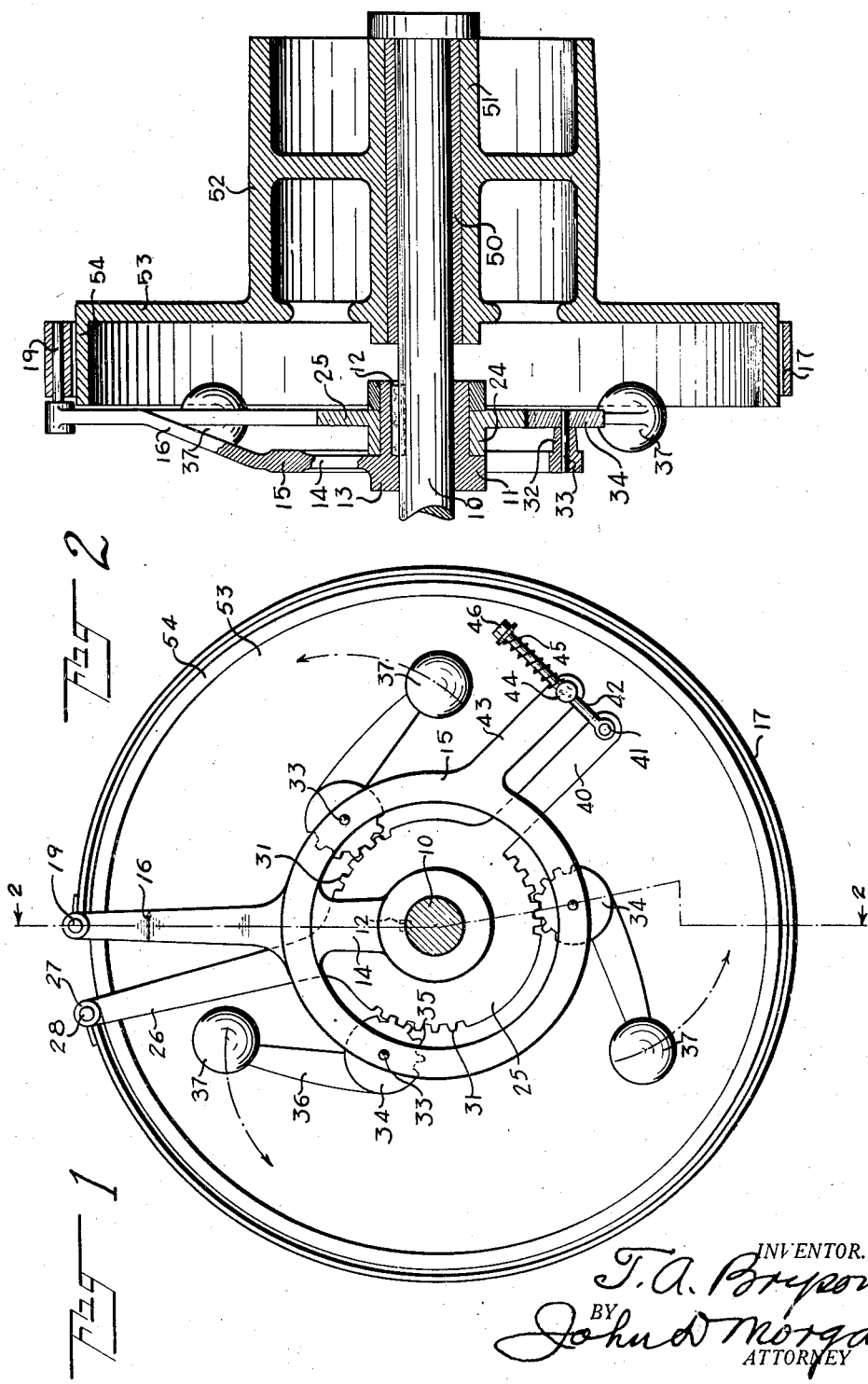
INVENTOR.
T. A. Bryson
BY John D. Morgan
ATTORNEY July 29, 1930.  T. A. BRYSON  1,771,525
DRIVING MECHANISM
Original Filed Feb. 12, 1921  2 Sheets-Sheet 2
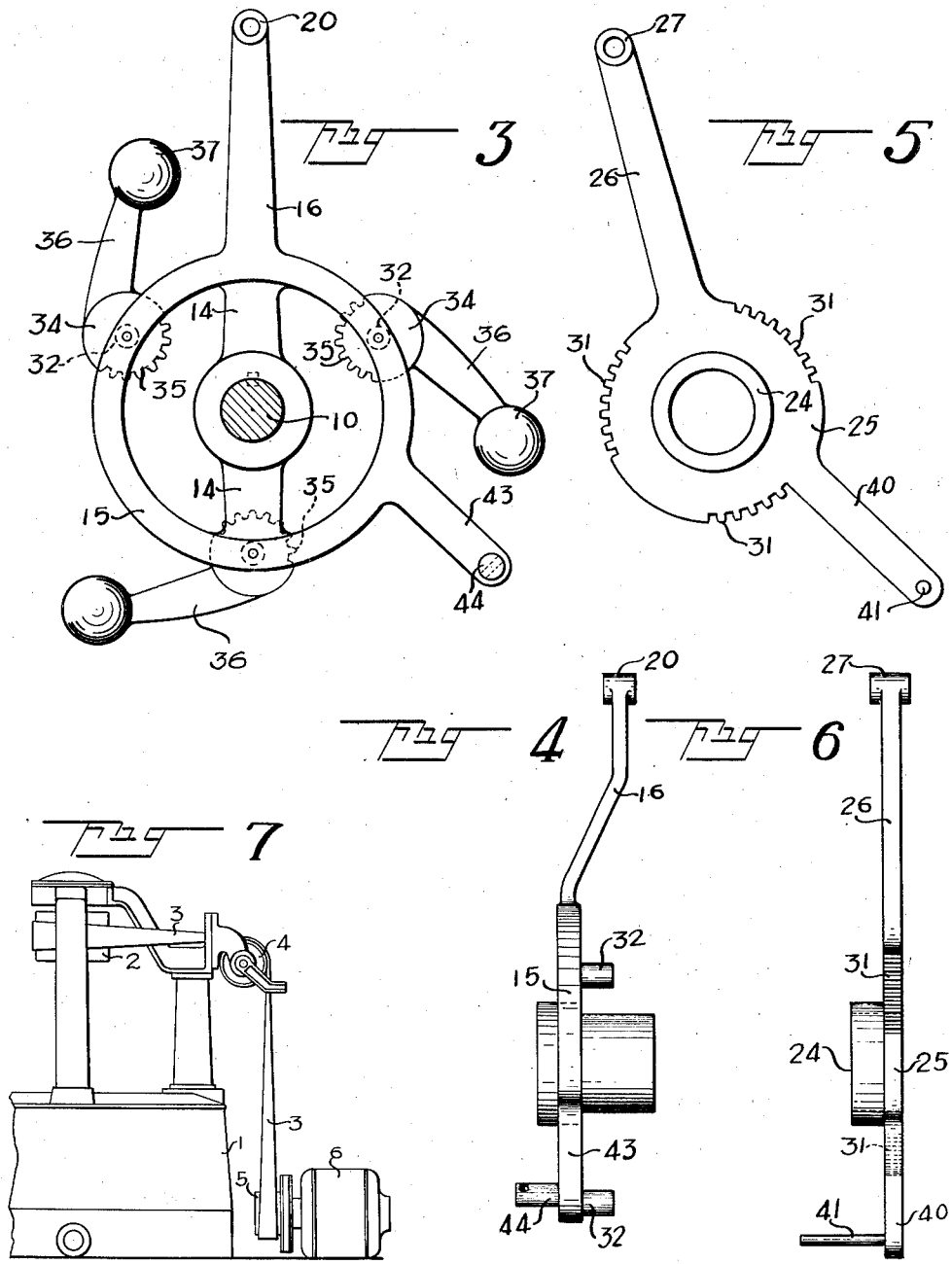
INVENTOR.
T. A. Bryson
BY
John D. Morgan
ATTORNEY.

Patented July 29, 1930

1,771,525

UNITED STATES PATENT OFFICE

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

DRIVING MECHANISM

Original application filed February 12, 1921, Serial No. 444,444. Divided and this application filed May 27, 1927. Serial No. 194,756.

The invention relates to mechanical driving means interposed between a motor and a machine driven thereby, and more particularly to a friction clutch and cooperating connections between a driving motor and the machine driven thereby, designed to provide for widely different low and high speeds of the load, and for the motor getting up speed before taking the load, and in certain of its features the invention is specially applicable to centrifugal extractors.

Objects and advantages of the invention will be set forth in part hereinafter and in part will be obvious herefrom, or may be learned by practice with the invention, the same being realized and attained by means of instrumentalities and combinations pointed out in the appended claims.

The invention consists in the novel parts, constructions, arrangements, combinations and improvements, herein shown and described.

This application is a division of my copending application Ser. No. 444,444, filed February 12, 1921, patented August 9, 1927, No. 1,638,239.

The accompanying drawings, referred to herein and constituting a part hereof, illustrate one embodiment of the invention, and together with the description, serve to explain the principles of the invention.

Of the drawings:—

Fig. 1 is an end elevation of a clutch embodying the invention;

Fig. 2 is a vertical, longitudinal section on line 2—2 of Fig. 1;

Fig. 3 is a detached side elevation of the centrifugally operated clutch member;

Fig. 4 shows the device of Fig. 3, with parts omitted, looking thereat from the right;

Fig. 5 is a detached side elevation of the clutch member operated by the member shown in Figs. 3 and 4;

Fig. 6 shows the device of Fig. 5, looking thereat from the right;

(The devices shown detached in Figs. 3 to 6 are shown assembled in Figs. 1 and 2);

Fig. 7 shows the drive of the foregoing figures applied between an electric motor and a centrifugal machine.

The illustrated embodiment in its main features comprises a driving member rotating with the motor shaft, and an adjacent driven member connected to a belt pulley or other connection to the driven machine, and a clutch device between the driving and driven members, the clutching action being determined or controlled by a centrifugally operated device and a spring cooperating or working against each other, the parts being proportioned and weighted to effect the clutching action at a predetermined speed of the motor shaft. The spring tension is variable or adjustable to effect changes in the predetermined motor or shaft speed at which the clutch engagement occurs.

More in detail, a flat disc is fixed on the motor shaft to rotate therewith, and adjacent thereto is a friction drum to which is fixed a belt pulley, and encircling the drum is a clutch band.

To one end of the clutch band is pivoted a lever mounted upon and concentrically with the disc fixed on the motor shaft. A second lever is pivotally connected to the other end of the clutch band, and is likewise mounted upon and concentrically with the driving disc.

Pivotally mounted on one of the levers, or on a ring fixed to or integral therewith are a plurality of arms to the outer ends of which are attached weights. The arms so mounted on said lever have geared connections with a geared circle or plate fixed to and concentric with the other lever, whereby the two levers move concurrently but in opposite directions, by which movement the clutch band is loosened to release the drum or tightened to clutch the drum.

Projecting from each of the lever structures is an arm, and between the two arms is a spring tending to press the arms together. When the disc is rotating the weights tend to swing outwardly under centrifugal force against the pressure of the spring. When the centrifugal force has reached a certain intensity or power, the spring is compressed to a degree where the clutch band clutches the drum to effect the driving action. The parts are so proportioned and weighted and the spring pressure is so regulated that the clutching action takes place at the desired or predetermined speed of the motor.

Referring now in detail to the specific structure, illustrated by way of example in the accompanying drawings, the invention is shown applied to the drive of a centrifugal machine, although it will be understood that it has application in the drive of other machines.

As exemplified, a centrifugal machine 1 is shown having a driving pulley 2, over which runs a driving belt 3. The belt 3 runs over a guiding pulley 4, and is driven from the device or mechanism 5, to which the present invention in certain of its structural features more particularly relates, the entire mechanism being driven from the motor 6.

Fixed on the shaft 10 of the motor 6 is a sleeve 11, keyed to the shaft by a key 12. Sleeve 11 comprises an external bearing hub 13, from which hub projects radially an arm, or a plurality of arms 14, from which is supported a ring 15 concentric with the shaft 10. Projecting from the ring 15 is a radially disposed arm 16, to which is pivotally connected one end of a clutching band 17, the band being connected to the arm 16 by means of a pin 19 fitting in a hub 20 formed in the exterior end of the arm. The clutch band 17 encircles the exterior of a pulley drum as will be later described.

Cooperating with the mechanism just described are devices adapted to cause the band 17 to engage the pulley drum at a predetermined speed, such devices operating by centrifugal action opposed by a spring, the tension of which is settable or regulable as desired. In the embodied form thereof, mounted on the exterior of the sleeve 11 is a sleeve 24, from which sleeve projects an annular plate 25, fixed to or integral with the sleeve. Projecting radially from the annular plate or disc 25 is an arm 26, which has formed in the end thereof a hub 27, in which is carried a pin 28 to which pin the other end of the clutch band 17 is attached.

The arms 16 and 26 extend radially and are relatively close to each other, the clutch band 17 being connected to each of these arms and encircling the pulley drum. As the arms 16 and 26 recede circumferentially from each other, the clutch band 17 releases the pulley drum, and as arms 16 and 26 are drawn toward each other, through connections and by devices later to be described, clutch band 17 tightens about the pulley drum and drives the pulley and its load.

In the embodied form of centrifugally operated and spring controlled mechanism, there are formed in the periphery of the plate or disc 25 groups or series of gear teeth 31, three such groups being shown. Formed in the ring 15 are three corresponding hubs 32, in which are mounted pins or shafts 33. Upon the shafts 33, respectively, are mounted discs or wheels 34, provided with gear teeth 35, which mesh with the gear teeth 31 upon the disc 25. Projecting from each of the discs or wheels 34 is an arm 36, carrying at its outer end a weight 37.

In the preferred embodiment of the invention, the centrifugally operated weights 37 are preferably symmetrically arranged, the disc 25 meshing with gear discs 34 causes each of the weights to influence the movement of the others and prevent any one of the weights from having excessive movement which would tend to unbalance the clutch. By this construction, the clutch always remains in balance, and the movement of the weights is uniform.

Fixed or integral with the disc or plate 25 is an arm 40, and pivotally mounted on a pin 41 in the exterior end thereof is a rod 42. Fixed to or integral with the ring 15 is arm 43 and projecting from the outer end thereof is a lug or pin 44, internally apertured, the rod 42 projecting therethrough. Encircling the rod 42 is a coiled spring 45, in tension between the lug 44 and a nut 46, screw-threaded on the external end of the rod 42. By screwing and unscrewing the nut 46 the tension of the spring 45 may be changed, and thus the force yieldingly drawing the arms 40 and 43 together may be varied.

The yielding and regulable spring action so exerted tends to move apart the arms 16 and 26, and to keep them yieldingly or resiliently held apart, and to keep the clutch band 17 loose about the pulley drum. As the shaft 10 rotates, centrifugal force will move the weights 37 outwardly, and through the action of the gear teeth 35 and 31 will draw the arms 16 and 26 together in oppsition to the pressure of the spring 45. The action or pressure of the spring remains fixed or constant, at the desired predetermined setting, while the force or power of the weights 37 increase with the speed of rotation of the shaft 10, thus the clutching or engaging action of the clutch band 17 will take place at any desired speed of rotation of the shaft 10, this being the speed at which the weights 37 through centrifugal action overcome the spring 45.

So far as concerns many features of the invention, the pulley mechanism may be of any desired form. As herein shown a friction sleeve 50 is loose on shaft 10 and sleeved thereon is a hub 51 of the pulley 52. At its inner end pulley 52 is fixed or integral with a disc member 53, the disc 53 at its outer or peripheral end terminating in an annular or crown flange 54 extending perpendicularly from the flat face of the disc 53 and constituting the clutch drum.

It will be understood that this typical illustration is exemplary of the operation of the invention and is nowise restrictive thereof. The invention may be applied to any power developing device whose speed torque characteristics are such as may make its use advantageous.

The invention in its broader aspects is not limited to the specific mechanisms shown and described but departures may be made therefrom within the scope of the accompanying claims without departing from the principles of the invention and without sacrificing its chief advantages.

What I claim is:—

1. A driving mechanism including in combination a motor shaft, a clutch mechanism comprising a disc fixed on the motor shaft, a drum, and a clutch device therebetween comprising two actuating members and pivoted centrifugally operated weights connected to one of the members and adapted to move the other member to clutch the disc and drum together, and connections from the drum to the driven machine and a spring connection between said members operating against the weights.

2. A driving mechanism including in combination a motor shaft, a clutch mechanism comprising a disc fixed on the motor shaft, a drum, and a clutch device therebetween comprising two actuating members and pivoted centrifugally operated weights connected to one of the members and adapted to move the other member to clutch the disc and drum together, and connections from the drum to the driven machine and a spring connection between said members operating against the weights, and means for regulating the spring tension.

3. A driving mechanism including in combination a motor shaft, a clutch mechanism comprising a disc fixed on the motor shaft, a drum, and a clutch device therebetween comprising two actuating members and pivoted centrifugally operated arms provided with weights, the arms being connected to move one of the members, and a spring device between the members and opposing the centrifugally operated arms to cause the clutch device to operate at a predetermined motor speed.

4. A driving mechanism including in combination a motor shaft, a clutch mechanism comprising a disc fixed on the motor shaft, a drum, and a clutch device therebetween comprising two actuating members and pivoted centrifugally operated arms provided with weights, the arms being connected to move one of the members, and a spring device between the members and opposing the centrifugally operated arms to cause the clutch device to operate at a predetermined motor speed, and means for varying the spring tension to effect changes in said predetermined speed.

5. A driving mechanism including in combination a motor shaft, a clutch mechanism comprising a disc fixed on the motor shaft, a drum, and a clutch device therebetween comprising two actuating members and pivoted centrifugally operated weights adapted to move the one of the members to clutch the disc and drum together, and connections from the drum to the driven machine, and a spring connection between said members operating against the weights.

6. A driving mechanism including in combination a motor shaft, a clutch mechanism comprising a disc fixed on the motor shaft, a drum, and a clutch device therebetween comprising two actuating members and pivoted centrifugally operated weights adapted to move the one of the members to clutch the disc and drum together, and connections from the drum to the driven machine, and a spring connection between said members operating against the weights, and means for regulating the spring tension.

7. A driving mechanism including in combination a driving shaft, a clutch mechanism comprising a disc fixed on the driving shaft, a drum, and a clutch device therebetween comprising a clutch band fixed to the disc, an actuating lever, and centrifugally-operated weights pivotally connected to the disc and having a geared engagement with the lever to move the lever relatively to the disc to clutch the disc and drum together.

In testimony whereof, I have signed my name to this specification.

TANDY A. BRYSON.